United States Patent Office 3,520,107
Patented July 14, 1970

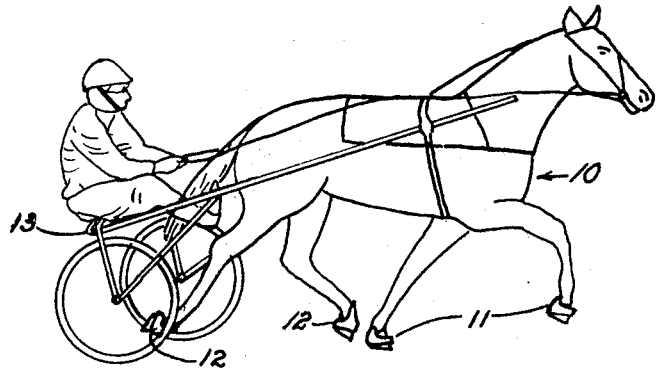
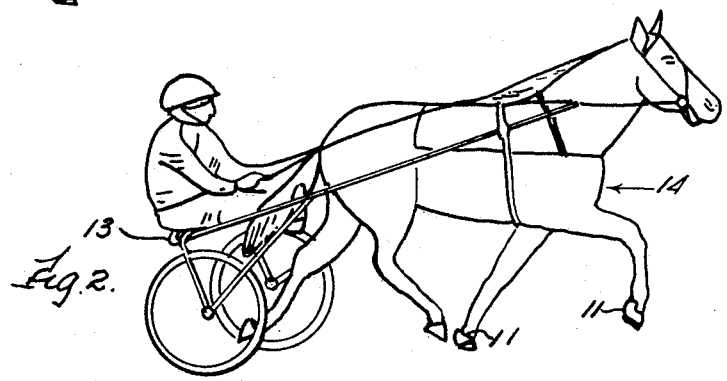
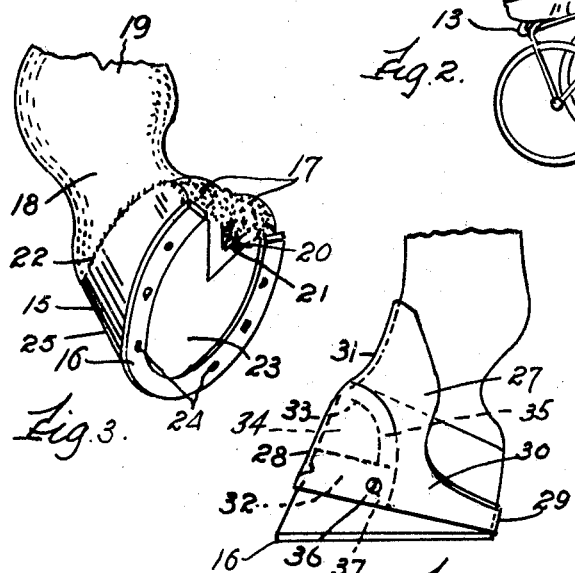
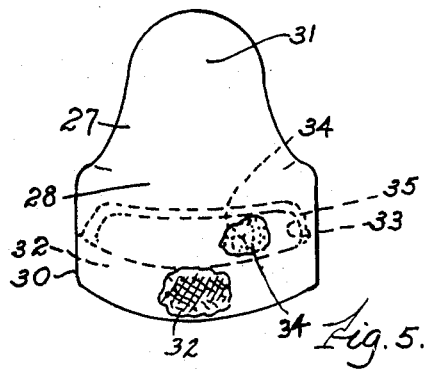
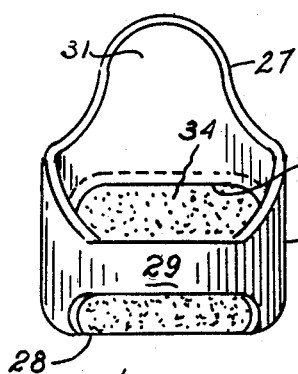
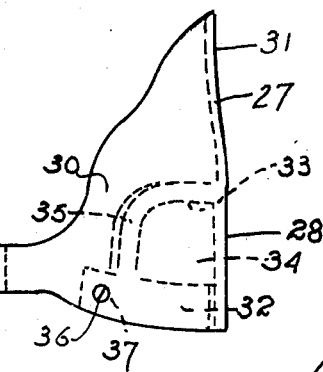

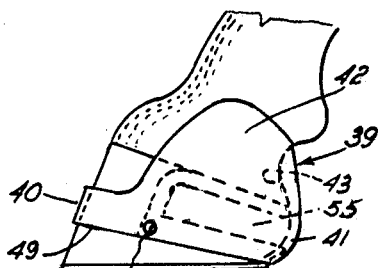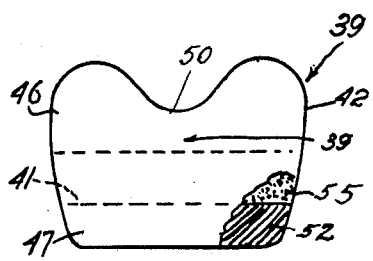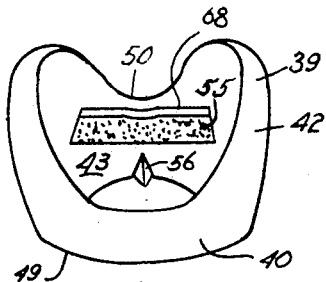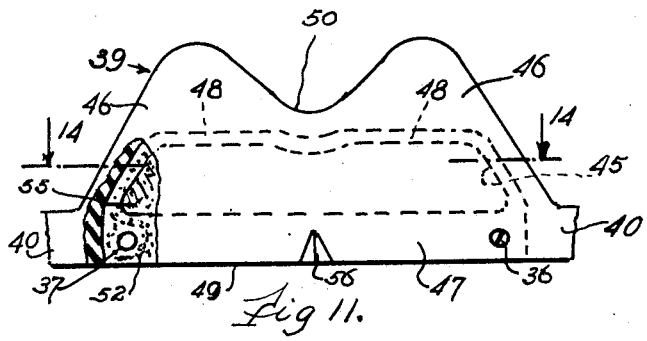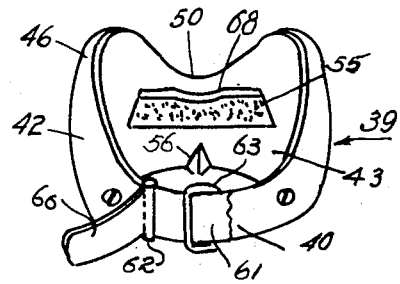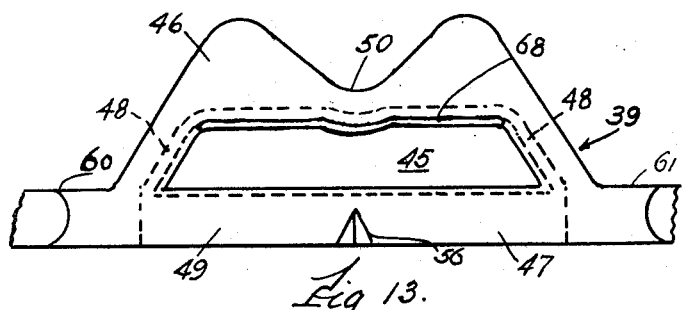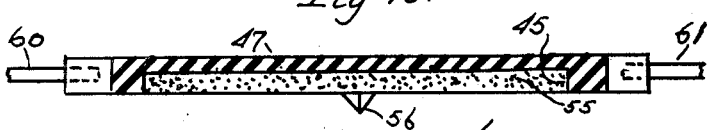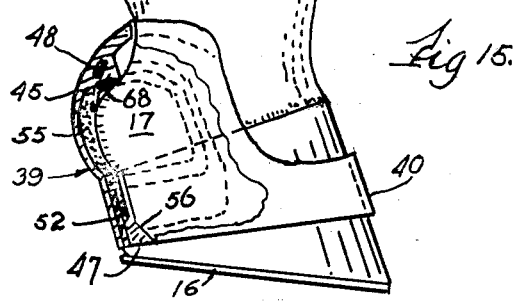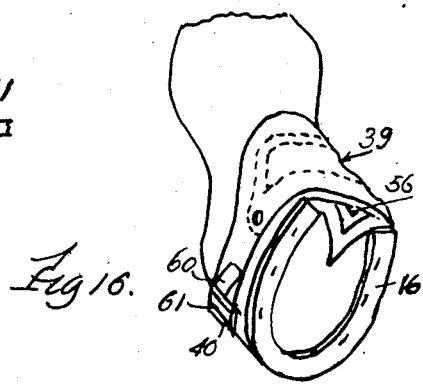
INVENTORS.
Leonard J. Haryett.
Joseph B. Lindecker.

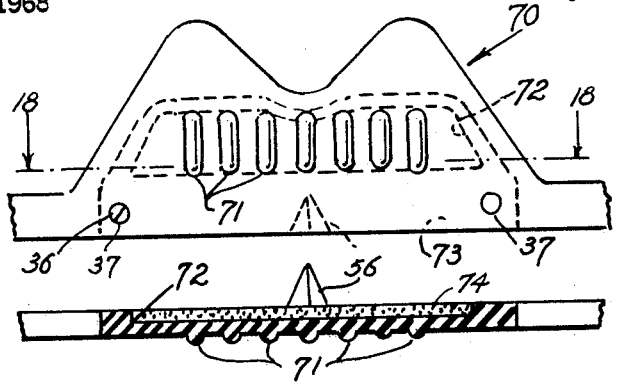
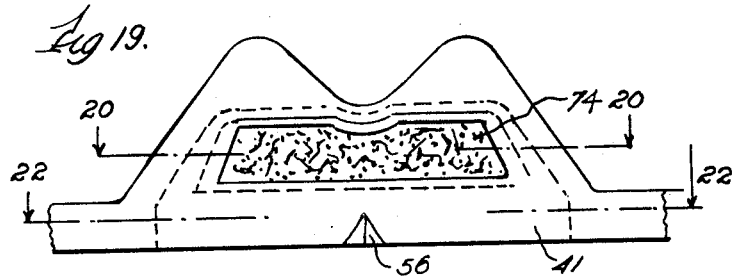
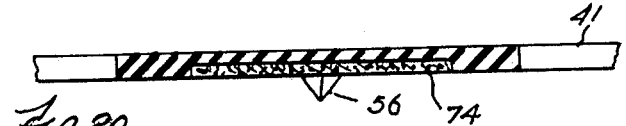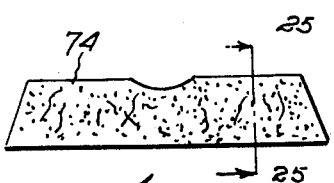
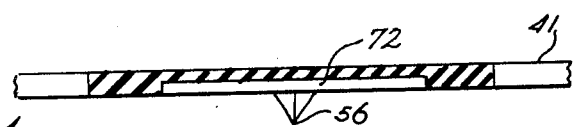
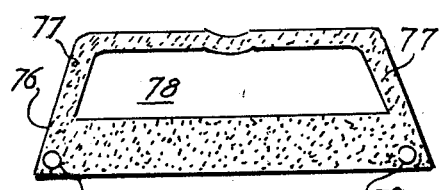
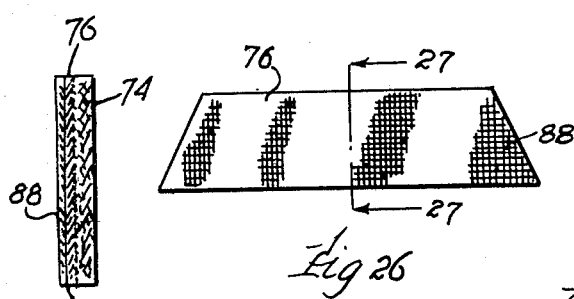

3,520,107
PROTECTIVE BOOT FOR HORSES
Leonard James Haryett, 2825 25th Ave., Regina,
Saskatchewan, Canada, and Joseph B. Lindecker,
1193 Valetta Drive, Temperance, Mich. 48181
Filed Apr. 2, 1968, Ser. No. 718,131
Int. Cl. B68c 5/00
U.S. Cl. 54—82                                    14 Claims

ABSTRACT OF THE DISCLOSURE

A protective boot for use over the feet of trotting and pacing horses to prevent injury at the coronary band, the quarters, pastern and fetlock joint; especially during a fast workout of a race by the occurrence of hooves striking the feet and legs. It provides an improved boot formed of tough, impact-resistant elastic material adapted to be snugly applied over the hoof and foot of the horse and to grip it elastically. One of the features resides in the provision of a body portion and a strap securing means, the body portion having an upper section and a lower section, the upper section provided with a special, horizontally arranged recess in the inner surface of the wall thereof, and is filled with a stretchable element such as a pad of foam rubber to contact and fit over the quarters of the foot; the lower section being provided with a non-stretchable, deformable, reinforcing member secured and wholly enclosed between the front and rear walls thereof, it being of substantially rectangular shape with integral frame or arm like portions extending from its ends and into the upper section of said boot to surround the recess and the foam rubber element therein, thereby reinforcing all the area around the foam rubber element; the foam rubber element preventing the boot from riding on the hoof while elastically gripping the quarters of the foot effecting the stretchable portion of the foam rubber element and the adjacent wall of the boot to assume the shape of the quarters of the foot when applied thereto. An integral body ridge member is also formed along the upper edge of the recess and extending outwardly from the ridge in a horizontal plane to assist in preventing riding of the boot in a vertical direction. This abstract is neither intended to define the invention of the application which, of course, is measured by the claims, nor is it intended to be limited as to the scope of the invention in any way.

---

Devices known as "scalping boots" made of elastic material, applicable to the hind feet of horses, have been known and used for many years, to protect the front flesh of the hind feet directly above the hoof. Quarter boots, also made of elastic material have been used of late years, and are adapted to be fitted snugly over the front foot of the horse and to grip it elastically. Some quarter boots have recesses in the inner surface of the rear wall to accommodate the bulbs of flesh behind the hoof.

This invention relates to protective device for use over the feet, pasterns and fetlock joints of trotting and racing horses.

A common injury to such racing horses results when one shod hoof strikes another foot, its pastern, on fetlock joint. The most common places for such injuries to occur are at the coronary band, the quarters, pastern and fetlock joint. While there are in existence racing boots made of rubber designed to protect these areas, one of the main objections to their use is that they cannot be securely affixed to the foot. These boots fit tightly with the rubber under tension and when they are struck by one of the horse's shod feet, they are easily cut and then thrown off, at which point, the horse loses the protection afforded by such boots. Aside from the fact that during a workout or a race, these boots will provide limited protection until they are cut and thrown off, the loss of weight on the horse's foot from a lost boot creates an immediate imbalance which affects the horse's stride. Almost all horses require these protective devices because it is virtually impossible for a horse to get through a fast workout or race without the occurrence of hooves striking the feet and legs. Any cause which alters the stride of an otherwise well gaited horse will cause one or more of its legs and hooves to strike the others. A muddy track with unsound footing, a quick change in direction by the driver, either reining his horse in or swinging it to avoid an accident, will alter the stride of the horse which invariably results in one foot being struck by another shod foot. Even without such external causes, most well gaited horses do not have perfect conformation and, often the horse's feet and hooves strike each other. The design of present day boots makes it practically impossible for a horse to retain these boots on a muddy track. This accounts for the fact that so many horses break or are ruined on a muddy track.

The trotting horse's feet and legs work diagonally across from each other, that is, the right front foot is in a forward motion at the same time as the left hind foot is in forward motion and the left front foot is in a backward motion. In the event the left front foot does not move out of the way of the left hind foot, the hind foot with its metal shoe, will strike against the pastern or quarters of that front foot causing great pain and frequently, permanently injure the front foot. It also happens that the toe of the left front might scrape along the top of the left hind foot, hitting the coronary band or pastern and fetlock of the left hind foot, resulting in injury to that hind foot and affecting the stride of the horse; a break then occurs. These horses normally wear resilient bell boots on their front feet and resilient scalper boots on their hind feet. The hind foot must have the protection of a scalper boot which must not come off during a race. With the unsecured and unreinforced rubber boot, the shod hoof often strikes the rubber boot over the hoof and cuts its, almost invariably resulting in a tearing of the boot and its being thrown off. It is imperative therefore, that these boots be secured to the foot so as to prevent their being thrown off.

In the pacing horse, the two feet on the one side move forward while the two feet on the other side move backwards, resulting in a swaying motion. As the feet in motion swing past each other there is a grave danger of a hind foot striking the opposite front foot. Even without external causes, most well gaited pacers do not have perfect conformation and their legs may cross-fire causing a hind foot to strike the opposite front foot as aforementioned. Such an injury will cause the horse to be thrown on a break which will be followed by direct striking on the front feet by the hind feet and almost certain injury to the horse.

The pacing horse wears quarter boots on its front feet. The same danger of weakening and cutting boots with the same results is present. This invention provides for a reinforced rubber boot equipped with foam rubber means to prevent the boot from slipping upwardly or being thrown off the foot.

In the scientific sport of harness racing, either trotting or pacing, the hoof must be trimmed for the particular gait of the individual horse, the type of shoe to be applied, the exact weight of the shoe, the exact toe length, and the addition or loss of a protective boot, besides protecting the sensitive parts of a horse's foot, can seriously affect the performance of the horse in a race or a fast workout. The object of this invention is to provide simple, durable, light weight devices of inexpensive construction which may be easily applied and secured to the racing horse's feet to get a maximum of protection. Furthermore, this invention includes a device to provide maximum confort for the horse wearing a protective quarter boot. The improved quarter boot contains an inner recesses chamber which is filled with sponge rubber designed to conform readily to the contours of the very tender part of the heel of the foot and will be a fitted cushion, solely for the comfort of the horse. This cushion will be easily replaceable at a negligible cost and could be replaced in minutes by the most unskilled stable hand. This invention further includes the application of rubber ribs placed above the reinforced portion of the quarter boot which covers the quarters of the front foot. The reinforcing element may be formed with eyelet holes, aligned with eyelet holes in the rubber boot body portion whereby the boot may be secured to the hoof by screw nails inserted through the eyelet holes therein and into the hoof.

A further object of this invention is to provide an adjustable quarter boot, designed to incorporate the previously mentioned novelties and further designed to include a reinforced belt and buckle that are an integral part of the quarter boot.

A further object of this invention is to provide an improved scalper boot to be used on the hind feet of trotting horses. This boot is designed to protect the coronary band, the pastern and the fetlock joints of the hind feet of trotting horses. As in the quarter boot, the upper portion will be provided with foam rubber and the lower portion of the scalper boot will be reinforced with a flexible non-stretching material provided with eyelet holes suitably located to enable the boot to be securely fastened to the horse's hoof by means of screw nails. Scalper boots will be designed to cover either the coronary band or pastern and fetlock joints. A further object of this invention is to provide an improved quarter boot for racing horses which includes the previously mentioned innovations, both being identical and designed to fit either foot.

A further object of this invention is to have an auxiliary stretchable fabric lining for the attaching surface of the foam rubber member so it won't work loose in the recess of the boot.

Quarter boots and scalper boots embodying the features of this invention are illustratively depicted in the accompanying drawings, in which:

FIG. 1 is a side view of a trotting horse in motion, hitched to a sulky, the horse wearing quarter boots on the front feet and scalper boots on the hind feet;

FIG. 2 is a side view of a pacing horse in motion, hitched to a sulky and wearing quarter boots on its front feet;

FIG. 3 is a perspective view of a horse's foot showing areas and joints which need protection;

FIG. 4 is a side view of a horse's hind foot showing the position of the scalper boot thereon and securely affixed to the horse's hoof by screw nails inserted through the boot and into the hoof;

FIG. 5 is a front view of a scalper boot, with a part in section showing the reinforcing material embedded in the lower section of the body portion of the boot;

FIG. 6 is a rear view of a unitary scalper boot showing the foam rubber element embedded in the inside wall thereof;

FIG. 7 is a side view of a scalper boot showing the embedded reinforcing element by dotted lines;

FIG. 8 is a side view of the quarter boot secured in position on the horse's foot showing a screw nail type securing means; the reinforcing means and flexible rubber member show by dotted lines;

FIG. 9 is an exterior rear view of a quarter boot with a cut-away section showing the reinforcing element and flexible rubber member;

FIG. 10 is a front perspective view of the unitary boot showing the foam rubber member embedded in the inside wall, a ridge of rubber thereover and triangular wedge shaped projection at the bottom;

FIG. 11 is a fragmentary exterior rear view showing the quarter boot arranged in a straight vertical plane, a portion broken away showing the placement of the securing nails through the boot;

FIG. 12 is a front perspective view, similar to FIG. 10, and showing the reinforced strap and buckle as an integral part of the boot;

FIG. 13 is a fragmentary inside front view showing the quarter boot arranged in a vertical straight plane, showing the recess formed in the wall thereof and the rubber ridge projecting thereover;

FIG. 14 is a sectional view of the quarter boot taken on line 14—14 of FIG. 11;

FIG. 15 is a side of a horse's foot with a quarter boot in position thereon, with a portion of the boot in section showing the foam rubber member forced outwardly by the quarters of the foot in contact therewith;

FIG. 16 is a perspective view of a horse's front foot showing the reinforced quarter boot, secured in position by screw nails inserted into the hoof and resting on the trailing ends of the metal shoe;

FIG. 17 is a fragmentary outside rear view of a quarter boot arranged in a vertical straight plane, showing the parallel vertical ribs extending from the top edge of the reinforcing element to the top edge of the recess with the foam rubber therein;

FIG. 18 is a sectional view taken on line 18—18 of FIG. 17;

FIG. 19 is a fragmentary inside view of a quarter boot arranged in a vertical straight plane, showing its recess and foam rubber therein;

FIG. 20 is a sectional view taken on line 20—20 of FIG. 19;

FIG. 21 is a sectional view of the boot shown in FIG. 20, but with the foam rubber removed;

FIG. 22 is a fragmentary sectional view taken on line 22—22 of FIG. 19;

FIG. 23 is a side plan view of the piece of foam rubber to be assembled in the recess portion of the boot;

FIG. 24 is a side plan view of the piece of reinforcing nylon to be assembled within the wall of the lower section of the boot;

FIG. 25 is a vertical sectional view on an enlarged scale taken on line 25—25 of FIG. 23;

FIG. 26 is a side plan view of a piece of foam rubber as shown by FIG. 23, but having a flexible, stretchable piece of fabric attached to the one side thereof to be inserted into the boot recess; and FIG. 27 is a vertical sectional view on an enlarged scale take on line 27—27 of FIG. 26.

This invention has been developed to provide an improved boot for protecting racing horses' feet against injuries as stated above. It is most desirable to make the quarter boots and scalper boots interchangeable by embodiment of similar design, the right boot being the same as the left boot in configuration, in each type of boot. Show horses, saddle horses and pacing horses are in great need of requiring reinforced boots. However, racing horses are in greater need of requiring reinforced boots with additional stretchable foam rubber members assembled in the recess in the wall thereof, since racing horses are subject to more serious injuries.

Referring specifically to the drawing, wherein like reference characters have been used throughout the several views to designate like parts, reference is first made primarily to FIG. 1 wherein 10 designates a trotting horse wearing quarter boots 11 on the front feet and scalper boots 12 on the hind feet, and hitched to a sulky 13. In FIG. 2, the pacing horse 14 is wearing quarter boots 11 only on the front feet. The areas and joints of the horses foot are very important to the use of this invention and are shown by FIG. 3, having a shoe 16 applied to the horse's hoof 15. The hoof includes the usual quarters 17, located below the pastern 18 which in turn is immediately below the fetlock 19 or ankle joint. Intermediate the quarters 17 at the back of the hoof there is provided a groove, or crevice 20 which runs into the frog, or fourchette 21 of the hoof 15. The coronary band or hairline 22 is adjacent the top of the hoof. The sole 23 of the foot is shown with the metal shoe 16 secured thereto by nails 24. The hoof 15 has an outer hard shell 25 embodied therewith.

The scalper boot 27 shown by FIGS. 4 through 7 is a substantially tubular element having a front wall 28, a rear wall 29, side walls 30, the wall 28 having a high wing portion 31. A reinforcing member 32 being embodied within the front wall 28 adjacent the lower edge portion thereof, said reinforcing member 32 being a flexible, non-stretchable element generally composed of nylon fibers, said member 32 having a substantially straight top edge portion which is substantially parallel with the bottom edge portion of the boot and having a vertical height of approximately five eighths of an inch. The wall 28 being provided with a recess 33 having equal portions arranged somewhat symmetrically on opposite sides of the vertical center line. The recess 33 serves to accommodate a stretchable, flexible, latex pad type member 34 generally composed of foam rubber, the foam rubber being compressed and fitting tightly into the recess 33 when applies to a horse's foot. The reinforcing member 32 being non-stretchable and molded within the boot forming an integral part thereof. The pad 34 being flexible, stretchable and a removable, replaceable element which is of the same shape as said recess 33 has the advantages of extreme lightness in weight, high reliency, and high restorative power so that even under continued pressure the pad will instantly assume its original shape and size when pressure is removed, no permanent compacting of the substance resulting.

The reinforcing member 32 composed of nylon fibers, or the like, having substantially the shape of a trapezoid with upper and lower parallel edges and having a frame or arm like portion 35 extending upwardly from its ends and being integrally united above the recess 33 and resilient pad 34, giving reinforcement to the boot all around the recess 33. The rear wall 29 resting upon the trailing end of the metal shoe 16, the front wall 28 being in tight contact with the outer shell 25 of hook 15 whereby the foam rubber pad prevents the boot from sliding on the hoof. Upon mud roads, or race tracks the boots are in greater danger of slipping off the hoof, and in such instances screw nails 36 are inserted through holes 37 provided in the side walls 30 of the boot and reinforcing member 32 and driven into the hoof 15. The scalper boots described above are identical so they can be placed upon either the right or left hind foot of a horse; this being desirable where certain horses only destroy boots on one certain hoof and not requiring the purchase of a set of boots. Should the horse need a quarter type boot and none is at hand, the scalper boot can be applied to a front foot in reverse position, the recess and rubber pad therein fitting over the quarters of the foot.

The quarter boot 39 shown by FIGS. 8 through 11 is a substantially tubular element having a front wall 40, a rear wall 41, and an outer side wall 42, an inner side wall 43. The walls 41 and 42 are appreciably higher than the front wall 40; the side walls 42 protect the quarters of the foot.

The rear and side walls are convexed outwardly like a barrel, whereby they snugly and effectively cover the corresponding regions of the foot when the boot is applied as indicated by FIG. 8. The boot 39 is composed of rough impact-resistant elastic material, such as rubber latex or its equivalent, same as the scalper boot 27 described above, and when it is applied to the foot it is adapted to fit snugly and to grip it elastically; the boot shielding the coronary flesh directly above the hoof and quarters of the foot. On the inner face of the rear wall 43 a recess 45 is provided, clearly shown by FIG. 13. The recess 45 is formed equally on opposite sides of the vertical center line. The boot 39 has a top body portion 46 and a reenforced lower body portion 47 integral with each other. The front wall 40 forming a strap integrally connected with the opposite edge portions of the side walls 42 of the lower portion 47, forming a substantially circular lower peripheral edge 49 for the quarter boot 39. The top edge of the upper body portion 46 is curved inwardly and downwardly at its center portion 50. The lower body portion 47 is provided with a fiber type reinforcing element such as a nylon member 52, the reinforcing element being non-stretchable, being embodied entirely inside and between the walls of the boot, the lower edge of the nylon member 52 being in juxtaposition with the lower edge of the lower portion 47; the main body portion being substantially rectangular with integral arm type elements 48 extending upwardly and inwardly joining at the central section of the upper body portion 46, leaving an open area therein where said recess 45 is formed. The top edge of the recess 45 and the central portion of the arm or frame element 48 body being curved downwardly at the center hereof, as said frame element 48 surround the recess 45 with no unprotected area therebetween. The inner wall 43 has a rubber triangular shaped ridge 68 adjacent and above said recess 45 and enclosing the horizontal portion of said reinforcing frame element 48, clearly shown by FIGS. 12 and 15; said ridge riding on the top portion of the foot quarters when the boot is applied thereto. FIG. 15 clearly shows how the quarters 17 force the foam rubber element 55 arranged in said recess 45 and the wall portion 46 outwardly, when the boot is applied to the foot of a horse. The foam element 55 is made the same as element 34 and is of the same shape as the recess 45. FIG. 11 clearly shows the foam element 55 and reinforcing member 52 arranged in the quarter boot 39, said reinforcing member having hole 37 therein to receive screw-nail 36 for securing the boot to the hoof if desired. The rear wall 41 is also provided at its bottom edge, centrally thereof, with an inwardly projection 56, preferably of triangular cross-section with the apex upward. This projection 56 is adapted to fit into the crevice 20 of the hoof. Thus it serves not only to position and retain the boot on the foot circumferentially, but it prevents the boot from riding on the hoof at the rear, cooperating with the foam rubber pad 55 which prevents the boot from riding on the hoof at the front.

As shown by FIGS. 12, 13, 14, and 16 the quarter boot 39 has its front wall 40 constructed of two portions, or strap type members 60 and 61, said strap 60 having a metal loop 62 to receive the end portion of the strap member 61, said strap being folded over and inserted through metal loop 63, locking it in position when applied to a horse. It is obvious that many types of buckle or other securing means may be used to secure the boot tightly upon the hoof.

FIG. 13 clearly shows the quarter boot 39 with recess 45 therein, before the foam rubber member 55 is arranged therein. FIG. 14 clearly shows in section how the foam rubber pad 55 fits into the recess 45, and with straps 60 and 61 extending from opposite sides of the lower body portion 47; said straps may be integral members or fabric type straps fastened securely with the boot.

Quarter boots 70, as shown by FIG. 17, are formed with exterior vertical ribs 71 extending from the top edge of the reinforcing element 73 to the top edge of the recess 72 arranged above the reinforcing members 73, similar to the described elements in boot 39. The ribs 71 being of solid rubber, integral with the boot body, are of substantially the same length and form outside protection to the wall of the boot adjacent the recess 72 thereof.

FIG. 23 shows a foam rubber element 74 suitable to be assembled within the recess 72 of quarter boot 70. The surface area of a foam rubber element 74 is often rough due to openings and grooves therein due to method of manufacture. Foam rubber is commonly prepared by whipping compounded rubber latex containing a foaming agent into a foam, or by stirring the compound latex into a separately prepared foam, then poured into a mold by which it is shaped in the desired form and after gelling thereof is vulcanized in the mold. Low spots or voids some times occur. Adhesive can be applied to the rough surface on one side of the element 74, then placed within the recess 72, of boot 70.

FIG. 24 clearly shows the reinforcing element 76 which can be molded with arm members 77 and opening 78 therein before it is encased within the rubber boot, the opening 78 allows the recess 72 to be formed within the wall of the boot without interference. Openings, or holes, 79 are provided in the reinforcing member 77 whereby screw-nails may be inserted.

When it is desired to replace a foam rubber element 74, it can be done by inserting the foam pad in the recess 72 without adhesive, or with liquid adhesive, or by having the one surface of the pad covered with a flexible fabric 76, vulcanized thereto and which will stretch therewith. A layer of self-sticking adhesive 77 is applied to said fabric 76, and a removable cloth sheet 88 is applied thereto. See FIGS. 26 and 27. It is obvious that just before a race the boots may be inspected and if a new pad is needed, the recess 72 is cleaned, the cloth sheet 88 is removed from fabric 76 of pad 74 and the pad 74 assembled in the recess 72 and held therein by the self-sticking adhesive 77.

The invention is economical to manufacture and highly efficient in use.

It will be understood that modifications and variations may be effected without departing from the scope of the novel concepts of the present invention.

We claim as our invention:

1. A protective boot adapted to encircle the hoof of a horse and being constructed of a tough impact resistant material wherein selected areas thereof contain a deformable, structural reinforcing non-stretchable element embodied within the walls thereof, and a resilient, stretchable element supported by the inner wall surface thereof, said boot comprising a resilient central body member and an integral resilient strap member, said strap member elastically securing said body portion to the hoof of a horse, said central body portion having an upper section and a lower section, the top of said central body portion being curved downwardly at its sides to form curved wing portions adapted to grip the foot elastically above the hoof, the said upper section having the stretchable resilient element supported upon its inner surface preventing the entire boot from riding on said hoof, the said lower section embodying the reinforcing, non-stretchable element wholly within its wall and between the front and rear wall surface thereof, said reinforcing element having integral reinforcing arm portions extending from its ends and upwardly into said upper section and horizontally above said stretchable resilient element, thereby forming a reinforcing means completely surrounding the said stretchable element supported by said inner wall of said upper section.

2. The protective boot for horses as described in claim 1 wherein a substantially horizontal ridge portion extends outwardly from the inner wall surface of said central body portion and in juxtaposition with the top substantially horizontal edge of said stretchable resilient element.

3. The protective boot for horses as described in claim 1 wherein a substantially horizontal ridge portion extends outwardly from the inner wall of said central body portion and in juxtaposition with the top substantially horizontal edge of said stretchable resilient element and adjacent said arm portions of said reinforcing, non-stretchable element, said ridge portion contacting the upper quarter portion of the foot preventing vertical riding of the boot when applied to the foot.

4. A protective unitary scalper boot for a horse's hind foot adapted to encircle the hoof of a horse and constructed of a resilient material wherein selected areas contain a deformable, structural reinforcing non-stretchable nylon element embodied within the walls thereof and a resilient, stretchable foam rubber element secured to the inner wall surface thereof, said boot comprising an integral resilient heel strap and resilient central body portion, said body portion forming a guard for the front of the hind foot including the coronary band, pastern and fetlock joint, the upper edge portion of the said body portion curved downwardly to provide wing portions to form a guard for the side of the foot, the said top selected area known as the upper section provided on its inner surface with a recess that is shaped to accommodate the said resilient stretchable foam rubber element shaped to fit and remain therein as long as desired, the lower section of said body portion embodying the said reinforcing, non-stretchable nylon element which is arranged wholly within and between its front and rear wall surface thereof and having integral arm portions extending into the upper section of said body portion and surrounding said flexible stretchable foam rubber element, and said reinforcing nylon element embodying eyelet holes suitably located adjacent its end portions for receiving metal means for securing the said boot to the horse's hoof in addition to said heel strap.

5. A protective unitary quarter boot adapted to encircle the hoof of a horse and constructed of a tough impact-resilient material wherein selected areas contain a deformable, non-stretchable, structural reinforcing element embodied wholly within the walls thereof and a resilient, stretchable element secured to the inner wall surface thereof, said boot comprising an integral resilient strap and a resilient central body portion through which the said boot may be secured to the hoof, said body portion having an upper section and a lower section, the upper section of said body portion being curved inwardly at its central portion and downwardly at its ends to form curved wing portions adapted to grip the foot elastically in the coronary region directly above the hoof, the said upper section of said body portion further having secured upon its inner wall surface the said resilient, stretchable element for contacting the bulbs of flesh located behind the hoof when the boot is arranged upon the hoof, said stretchable element preventing the boot from riding on the hoof, the said lower section of said body portion embodying said reinforcing, non-stretchable element wholly within and between its front and rear wall surfaces and adjacent said resilient stretchable element.

6. The protective quarter boot for horses as described in claim 5 wherein the strap means includes two portions each secured at one end to said body portion and having their free ends provided with coacting means operably secured therewith to releasably secure said free ends together.

7. The quarter boot for horses as described in claim 5 wherein said resilient, stretchable element consists of foam rubber and said reinforcing non-stretchable element consists of nylon material, said nylon material having arm members which extend into said upper section adjacent the ends and adjacent the top edge portion of said foam rubber element, thereby forming a reinforcing area all around said foam rubber element.

8. The quarter boot for horses as described in claim 5 wherein the inner wall is provided with a recess shaped to accommodate the said resilient, stretchable element, said recess defining a horizontally laid indentation with substantially parallel upper and lower wall edge surfaces, and a body ridge extending from the inner wall surface adjacent the top edge of said recess.

9. The boot for horses constructed as in claim 5 including a triangular shaped wedge of deformable material projecting inwardly from the lower portion of the main body portion to be received by the frog of the foot for correct and instant positioning of the boot on the foot of a horse.

10. A quarter boot for horses constructed as in claim 5 with added exterior vertical rib like portions integral with the main body portion, said rib like portions substantially of the same length as the vertical height of said resilient stretchable element and arranged upon the exterior surface of said upper section and covering the exterior area adjacent said stretchable element secured on the interior surface thereof.

11. A protective unitary quarter boot adapted to encircle the hoof of a horse and constructed of a tough impact-resilient latex material wherein selected areas contain a deformable, structural reinforcing non-stretchable element embodied within the walls thereof and a resilient, stretchable element secured to the inner wall surface thereof, said boot comprising an integral resilient strap and a resilient central body portion, through which the said boot may be secured to the hoof, said body portion having an upper section and a lower section, the upper section of said body portion being curved inwardly at its central portion and downwardly at its ends to form curved wing portions adapted to grip the foot elastically in the coronary region directly above the hoof, the said upper section of said body portion further being provided on its inner surface with a recess which is shaped to accommodate the said resilient, stretchable element to fit and remain therein, said stretchable element contacting the bulbs of flesh located behind the hoof, said stretchable element preventing the boot from riding on the hoof, the said lower section of said body portion embodying the said reinforcing, non-stretchable element wholly within and between its front and rear wall surfaces and beneath said recess.

12. The protective quarter boot for horses as described in claim 11 wherein the said resilient, stretchable element consists of a replaceable pad of foam rubber, said pad having an adhesive means coating on the one side thereof coacting with the recess in said upper section.

13. The protective quarter boot for horses as described in claim 11 wherein the said resilient, stretchable element arranged in said recess consists of a replaceable band of foam rubber, said band having a stretchable fabric backing secured to one side thereof, said fabric having a self-sealing coating upon its exterior surface adapted to be secured to the wall surface of said recess when arranged therein, and a quick removable cloth member arranged over said coating to be removed when said foam rubber element is in said recess.

14. A protective unitary boot adapted to encircle the hoof of a horse and constructed of a tough impact-resilient material such as neoprene wherein selected areas contain a deformable, structural reinforcing, non-stretchable element such as nylon embedded within the walls thereof and a resilient stretchable element such as foam rubber secured to the inner wall surface thereof, said boot comprising an integral resilient strap and a resilient central body portion through which the said boot may be secured to the hoof, said central body portion having an upper section and a lower section, the said upper section of said body portion being provided on its inner surface with a recess shaped portion to accommodate the said resilient, stretchable foam rubber element which is shaped to fit and remain therein, said stretchable element preventing the boot from riding on said hoof, the said lower section of said body portion embodying the said reinforcing non-stretchable nylon element wholly within and between its front and rear wall surfaces, a body ridge portion projecting outwardly from the inner surface thereof and in a horizontal plane adjacent the top edge portion of said recess, and arm portions integral with said nylon element extending upwardly between the wall surfaces of said upper section adjacent the upper edge portion of said recess and adjacent said ridge portion, said ridge portion preventing the riding of said boot vertically on said hoof.

References Cited

UNITED STATES PATENTS

| | | | |
|---|---|---|---|
| 482,041 | 9/1892 | Hurd | 54—82 |
| 3,119,219 | 1/1964 | Cohen | 54—82 |
| 3,248,853 | 5/1966 | Code et al. | 54—82 |

HUGH R. CHAMBLEE, Primary Examiner

UNITED STATES PATENT OFFICE
CERTIFICATE OF CORRECTION

Patent No. 3,520,107                                        July 14, 1970

Leonard James Haryett et al.

It is certified that error appears in the above identified patent and that said Letters Patent are hereby corrected as shown below:

In the heading to the printed specification, line 5, "48181" should read -- 48182 --. Column 1, line 24, "is" should read -- it --. line 62, "on" should read -- or --.

Signed and sealed this 23rd day of February 1971.

(SEAL)
Attest:

Edward M. Fletcher, Jr.                              WILLIAM E. SCHUYLER, JR.
Attesting Officer                                               Commissioner of Patents